(12) United States Patent
Hatch

(10) Patent No.: US 6,367,810 B1
(45) Date of Patent: Apr. 9, 2002

(54) SELF-CENTERING SHAFT SEAL SYSTEM

(75) Inventor: Frederick Ronald Hatch, Ann Arbor, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/504,677

(22) Filed: Feb. 15, 2000

(51) Int. Cl.$^7$ ................................................ F16J 15/32
(52) U.S. Cl. ...................... 277/551; 277/562; 277/573; 277/581
(58) Field of Search ................................ 277/375, 309, 277/551, 562, 564, 569, 572, 573, 574, 576, 577, 580, 581

(56) References Cited

U.S. PATENT DOCUMENTS

| | | | | |
|---|---|---|---|---|
| 2,105,871 A | * | 1/1938 | Vigne | |
| 2,124,108 A | * | 7/1938 | Grece | |
| 2,186,537 A | * | 1/1940 | Salisbury | |
| 2,487,669 A | * | 11/1949 | Pattullo et al. | |
| 2,498,739 A | * | 2/1950 | Magnesen | |
| 2,626,839 A | * | 1/1953 | Creson et al. | |
| 2,692,783 A | * | 10/1954 | Foss | |
| 3,090,628 A | * | 5/1963 | Giulietti | |
| 3,368,821 A | * | 2/1968 | Papenguth | |
| 3,370,857 A | | 2/1968 | Roman | |
| 3,542,379 A | * | 11/1970 | Woodling | |
| 3,614,183 A | * | 10/1971 | Berens et al. | |
| 4,039,197 A | | 8/1977 | Schmidt et al. | |
| 4,147,367 A | * | 4/1979 | Smith et al. | |
| 4,522,328 A | | 6/1985 | Holzer | |
| 4,602,727 A | * | 7/1986 | Jackson | 222/368 |
| 4,664,393 A | | 5/1987 | Hazebrook | |
| 4,819,854 A | * | 4/1989 | Schmehr | |
| 4,822,059 A | | 4/1989 | Shimasaki et al. | |
| 4,834,397 A | | 5/1989 | Shimasaki et al. | |
| 4,889,349 A | * | 12/1989 | Muller | |
| 4,947,811 A | | 8/1990 | Binford | |
| 5,039,115 A | * | 8/1991 | Hebert et al. | |
| 5,040,804 A | * | 8/1991 | Back | |
| 5,332,234 A | | 7/1994 | Forch et al. | |
| 5,772,259 A | * | 6/1998 | Geary et al. | 285/145.1 |
| 5,855,375 A | * | 1/1999 | Wilcox et al. | 277/551 |

* cited by examiner

*Primary Examiner*—Anthony Knight
*Assistant Examiner*—Alison K. Pickard
(74) *Attorney, Agent, or Firm*—Reising, Ethington, Barnes, Kisselle, Learman & McCulloch, P.C.

(57) ABSTRACT

A seal assembly is undersized in relation to the bore in which it is installed to permit radial floating of the seal assembly within the bore to enable precise coaxial alignment between the seal assembly and shaft, despite misalignment between the axis of the shaft and the axis of the bore. A retaining ring urges a face seal of the seal assembly into static sealing engagement with the stepped face of the bore to prevent leakage of the fluid around the seal assembly.

10 Claims, 3 Drawing Sheets

SELF-CENTERING SHAFT SEAL SYSTEM

BACKGROUND OF THE INVENTION

1. Technical Field

The invention relates to shaft seals of the type used for sealing the gap between a housing and a rotary shaft, and more particularly to the construction and mounting of such seals to accommodate axial misalignment of the shaft and housing.

2. Related Prior Art

Compressors of the type used in air conditioning systems and the like include a rotatable shaft journaled within a compressor housing and carrying a working part such as a swash plate operative to compress a fluid refrigerant. The shaft extends through an opening or bore in the compressor housing and is rotated by a motor to drive the swash plate. A radial gap exists between the shaft and the housing bore which is closed by a shaft seal.

A typical shaft seal construction used in such compressor applications is shown diagrametically in FIG. 1. This seal has a metal carrier about the outer diameter of which is molded a rigid rubber mounting collar or sleeve sized in relation to the housing opening in which it is mounted to provide a press-fitted connection therebetween. In this way, the seal is caused to be aligned coaxially with the center axis of the housing bore and cannot move out of such alignment. The carrier also mounts an inner annular seal member having one or more lips encircling and dynamically sealing about an outer running surface of the shaft.

Optimum performance of the dynamic inner seal requires that the axis of the shaft be coaxially aligned with the axis of the seal so that the seal lips are uniformally loaded about their circumference. To achieve such coaxial alignment between the shaft and seal in the traditional seal system of FIG. 1, it is critical that the axis of the shaft be precisely aligned with the axis of the bore since the press-fit seal shares the same fixed axis as the bore. However, it is not uncommon for there to be some degree of axial misalignment between the shaft and bore due to inherent manufacturing tolerances, which must be borne by the seal. In the FIG. 1 arrangement, it will be appreciated that upon press fitting the seal into the bore of a housing, any misalignment of the shaft with respect to the bore will result in corresponding misalignment between the shaft and seal, making such seal press-fitted prone to early wear.

Accordingly, what is needed in the industry is a seal system that can accommodate variation in the axial relationship between the shaft and housing bore without impairing the sealing performance of the seal.

SUMMARY OF THE INVENTION AND ADVANTAGES

According to the invention, a self-centering shaft seal system is provided comprising a housing formed with a bore having a generally cylindrical wall of predetermined diameter disposed about a bore axis and an annular sealing shoulder disposed transverse to the axis. A shaft is supported for rotation within the bore having a generally cylindrical running surface disposed about a shaft axis. A seal assembly is disposed about the shaft and includes a metal carrier on which at least one radially acting shaft seal element is mounted about a longitudinal seal axis in dynamic sealing relation to the outer running surface of the shaft. The seal assembly also includes a face seal disposed axially between the carrier and the transverse sealing shoulder of the housing. According to a characterizing feature of the invention, the seal assembly is radially undersized in relation to the bore wall such that a radial clearance gap exists between the carrier and the bore wall free of any radial obstructions that would prevent radial movement of the seal assembly relative to the bore wall so as to enable the shaft seal element to support and center the seal assembly coaxially on the shaft, including when the shaft axis is misaligned with the bore axis, through a corresponding radial displacement of the seal assembly within the bore of the housing. Once aligned and mounted, the shaft seal element remains centered coaxially with the shaft during operation for optimum performance of the shaft seal element.

Accordingly, one advantage of the present invention is that the present seal system provides a shaft seal of a construction and size relative to the bore of the housing to enable the seal to center itself properly on the shaft whether or not the shaft is properly aligned with respect to the bore. Upon installation of the seal assembly within the bore about the shaft, the seal assembly will naturally seek its uniformally loaded condition, shifting the carrier if necessary radially within the bore to achieve coaxial alignment with respect to the shaft, even though the seal assembly may end up misaligned with respect to the bore. Such misalignment between the seal and housing is possible by provision of the designed-in clearance gap between the seal assembly and bore wall. Once centered, the seal assembly can be axially loaded by a snap ring or the like to urge the face seal into static sealing engagement with the transverse sealing shoulder of the housing to maintain the centered position of the seal assembly relative to the shaft and to prevent leakage of fluid past the carrier.

A method is also provided of sealing a rotatable shaft supported for rotation within a bore of a housing. The method involves forming the bore to include a bore wall of predetermined inner diameter disposed about a bore axis and a sealing shoulder disposed transverse to the housing axis. A seal assembly is provided having an outer diameter that is relatively undersized in relation to the inner diameter of the bore such that a carrier of the seal assembly is spaced from the bore wall to define a radial clearance gap therebetween. The carrier is provided with a shaft seal disposed about a seal axis and a face seal disposed transverse to the seal axis. The seal assembly is slid into position on the shaft within the bore to bring the face seal into position between the carrier and the transverse sealing shoulder of the bore. The shaft seal is allowed to center itself coaxially on the shaft independently of any misalignment between the shaft axis and the bore axis through corresponding radial displacement of the seal assembly within the bore of the housing.

The method shares the same advantages discussed above in connection with the seal system of the invention.

BRIEF DESCRIPTION OF THE DRAWINGS

These and other features and advantages of the present invention will become more readily appreciated when considered in connection with the following detailed description and appended drawings, wherein.

DETAILED DESCRIPTION

Figure 1:
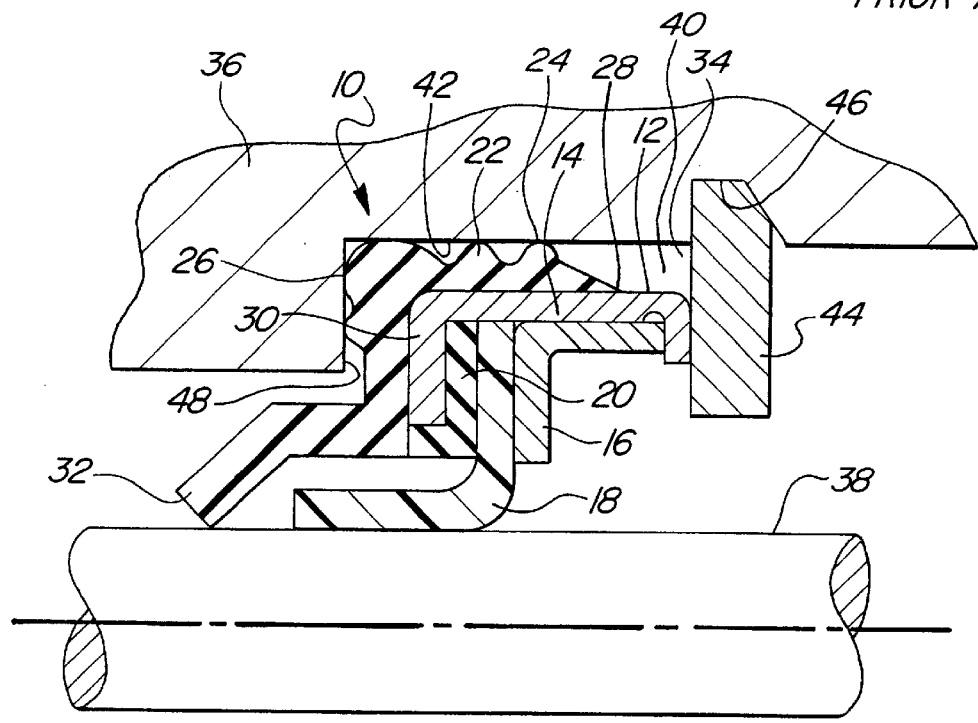
FIG. 1 is a schematic cross-sectional view of a prior art shaft seal system.

FIG. 1 shows a prior art shaft seal indicated generally at 10 having a metal carrier 12 with an outer case 14 and inner case 16. A main oil seal element 18 of PTFE (polytetrafluoroethylene) is clamped between the cases 14, 16 and sealed by an elastomeric gasket 20 which may comprise a separate component or a molded feature on one of the cases. An elastomeric mounting collar 22 is molded about the outer case 14 and includes a radial sleeve portion 24 overlying a cylindrical body portion 28 of the outer case 14 and an axial face portion 26 overlying an end flange 30 of the outer case 14 and terminating in a radially inwardly extending sealing lip 32.

The shaft seal assembly 10 is press fit into a stepped bore or opening 34 of a housing 36 through which a rotatable shaft 38 extends in radially spaced relation to the housing to define a gap 40 therebetween to be closed by the shaft assembly 10. The radial sleeve portion 24 is trapped between and compressed by the cylindrical body portion 28 of the outer case 14, such that the carrier 12 is supported by the compressed radial sleeve portion 24 of the mounting collar 22 against radial movement relative to the housing 36. Thus, the seal lips 18, 32 which engage and seal against the shaft, 38 are fixed in a predetermined concentric relationship relative to the axis of the opening 34 through which the shaft 38 extends. A retainer ring 44 mounted in a ring groove 46 compresses the axial face portion 26 of the collar 22 against a shoulder 48 of the stepped opening 34.

With the conventional seal arrangement of FIG. 1, it is important that the shaft 38 be precisely aligned coaxially with the axis of the opening 34 in order to ensure coaxial alignment with the shaft seal 10. It will be appreciated that under conditions where the shaft 38 is misaligned relative to the opening 34 such that there is not coaxial alignment between the shaft and opening, that the seal lips, and principally the main oil seal 18, is non-uniformally loaded about its circumference with one side of the seal being flexed greater than the radially opposite side leading to uneven wear of the shaft seal 10.

FIGS. 2–5 illustrate various embodiments of a sealing system according to the invention which maintain concentricity with the shaft despite the shaft being misaligned relative to the opening in which the seal assembly is mounted. In each embodiment, radial clearance is provided between the metal carrier of the seal and the wall of the opening and there is no intervening collar sized for a press-fit connection with the housing opening, such that the seal assembly is able to float in all radial directions relative to the opening in which it is installed. Of course, the metal carrier should be interpreted to include a rubber collar, provided that the overall carrier/collar is undersized relative to the opening such that the carrier/collar is free to float radially relative to the oversized wall of the opening. The annular seal lips which engage the shaft naturally find their uniformally loaded position and in doing so serve to self-center the seal concentrically about the shaft, even when the shaft is axially misaligned in the opening of the housing.

Figure 2:
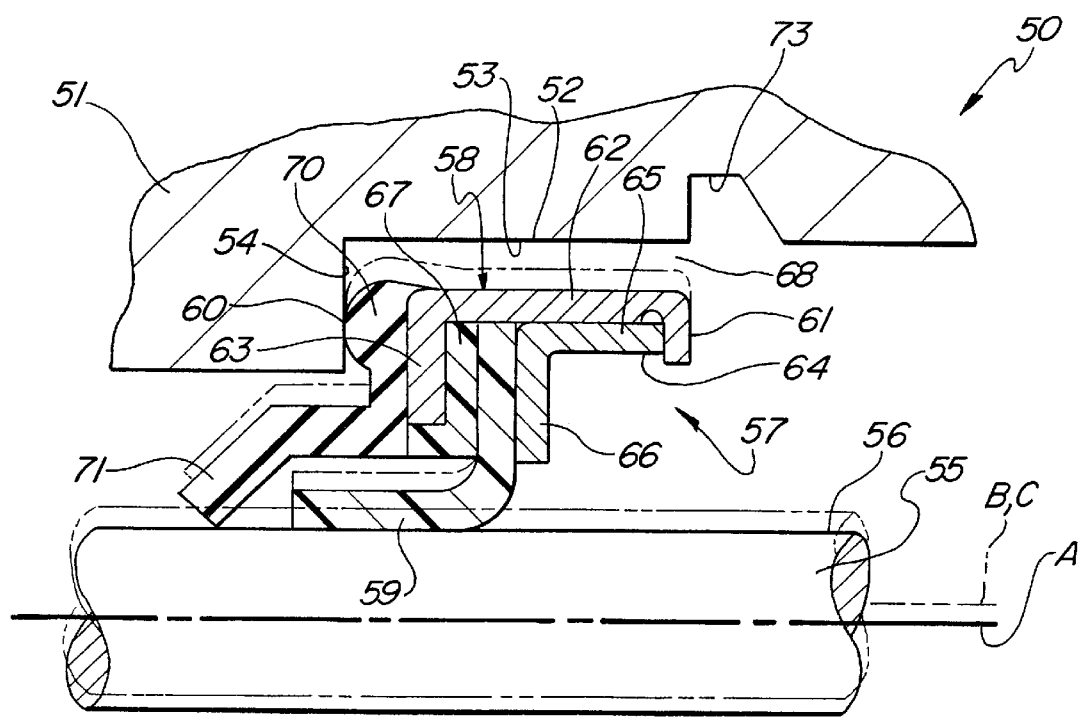
FIG. 2 is a fragmentary cross-sectional view of a seal system according to the invention.
Figure 3:
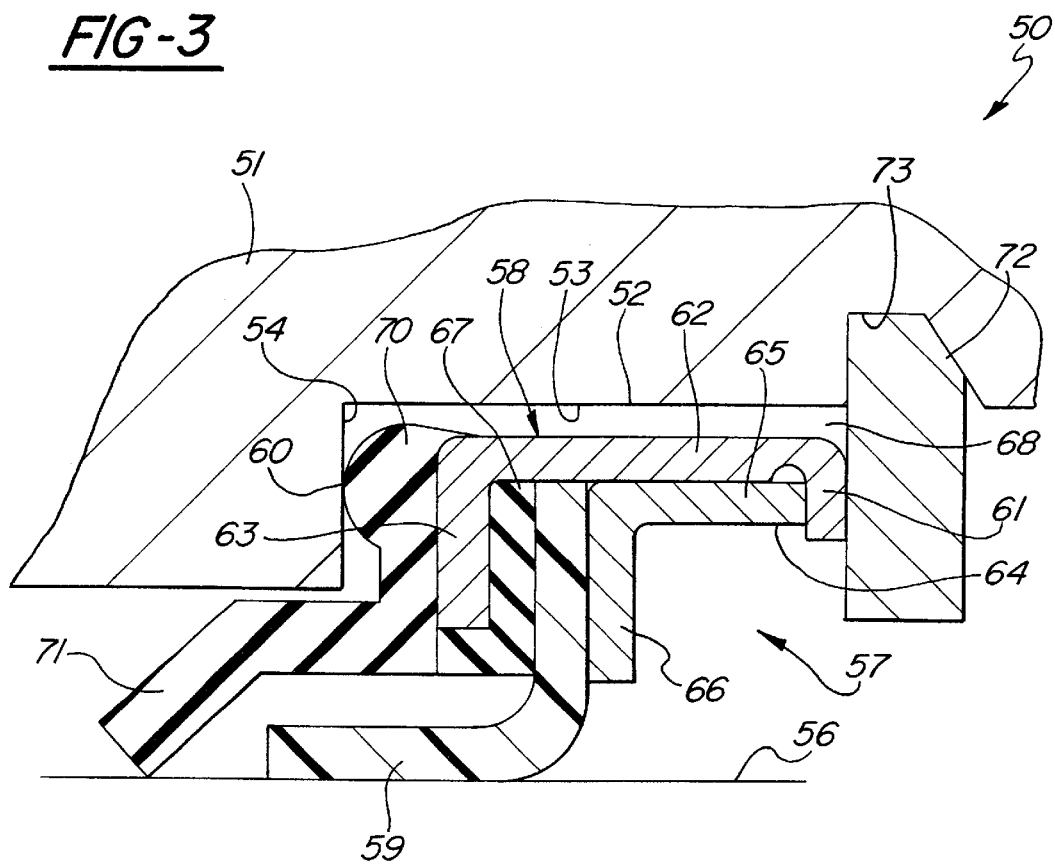
FIG. 3 is an enlarged fragmentary sectional view of the seal system of FIG. 2.

Turning to the first embodiment of FIGS. 2 and 3, a self-centering shaft seal system constructed according to the invention is indicated generally at 50 and includes a housing 51 formed with an opening or bore 52 having a cylindrical stepped bore wall 53 of predetermined inner diameter disposed about a bore axis A and including an annular axially facing sealing face or shoulder 54 disposed transverse to the bore axis A.

A shaft 55 is supported for rotation within the bore 52. The shaft 55 has a cylindrical outer running surface 56 disposed about a central rotation axis B of the shaft and spaced radially from the wall 53 of the bore 52.

The seal system 50 includes a seal assembly 57 disposed about the shaft 55 having an annular, rigid carrier 58 mounting at least one radially acting shaft seal element 59 about an axis C of the seal assembly 57 and disposed in dynamic sealing relation to the outer running surface 56 of the shaft 55. A face seal 60 is disposed axially between the carrier 58 and the sealing shoulder 54 of the housing 51.

The carrier 58 may be of the type including an outer annular metal case 61 having a cylindrical body 62 and a radially extending end flange 63, and an inner case 64 having a cylindrical body 65 and an end flange 66.

The main seal 59 is preferably fabricated of a PTFE disk or wafer clamped between the end flanges 63, 66 of the outer and inner cases 61, 64 and sealed against leakage by a intervening elastomeric gasket 67 in accordance with the usual manner for mounting such PTFE seals. It will be appreciated that the PTFE seal 59 could be mounted on the carrier 58 according to other techniques used in the sealing industry, including suitable bonding or overmolding, to secure the seal 59 and present a radially inwardly projecting lip seal which preferably lays down and extends axially along the cylindrical running surface 56 of the shaft 55 and which may include hydrodynamic features (not shown) to enhance the sealing effectiveness of the seal 59.

It will be seen in FIGS. 2 and 3 that the seal assembly 57 is radially undersized in relation to the cylindrical wall 53 of the bore 52 in such manner as to define a radial clearance gap 68 between the carrier 58 and the wall 53. The gap 68 is clear of any radial obstructions fixed to the carrier that would act to intervene between the carrier 58 and cylindrical wall 53 in a manner which would prevent radial movement of the seal assembly 57 relative to the bore wall 53 (i.e., prevent radial floating of the seal assembly 57). In comparison to the prior art seal of FIG. 1, it will be seen that the carrier 58 lacks the usual press-fit collar. Without it, the seal assembly 57 is free to float radially within the bore 52.

In this embodiment of FIGS. 2 and 3, the face seal 60 is fabricated of an elastomeric rubber composition and is molded onto the carrier 58, presenting a bulbous annular bead 70 projecting forwardly of the end flange 63 of the outer case 61 for static engagement with the annular sealing shoulder 54 of the stationary housing 51. The face seal 60 also includes a radially inwardly projecting annular sealing lip 71 that dynamically engages and seals about the shaft.

One application in which the radially floating seal assembly 57 of the invention is particularly well suited for is a compressor/clutch assembly used for compressing refrigerant in an automotive air conditioning system, for example, in which the compressor housing 51 is provided as two axial halves. In practice, the shaft 55 is mounted in one half of the housing and is then piloted through the bore 52 of the other housing half after which the halves are bolted together. The seal assembly 57 is then mounted in the bore 52 of the joined halves. It frequently happens that the axis of the shaft B is not precisely aligned with the axis A of the bore 52 of the assembled half of the housing 51. Such axial misalignment of the shaft relative to the bore is illustrated by the broken chain lines of FIG. 2, where the shaft 55 is shifted radially toward one side of the cylinder wall 53 from its true center position, shown in solid lines in FIG. 2. The seal assembly 57 according to the invention is able to compensate for such misalignments of the shaft 55 by self-centering itself on the shaft 55 through a radial adjustment of the position of the seal assembly 57 within the bore 52. During installation of the seal assembly 57 about the shaft 55 and into the bore 52, the resiliency of seal lips 59, 71 self-orients the seal assembly 57 in coaxial alignment with the axis B of the shaft 55. Once axial alignment between the seal assembly 57 and shaft 55 is achieved, a retainer ring 72 is installed within a ring groove 73 of the bore 52, engaging the carrier 58 and compressing the bead 70 of the face seal 60 axially between the end flange 63 of the outer case 61 and the sealing shoulder 54 of the bore 52 to provide a fluid-tight radial static face seal therebetween, preventing fluid from escaping the housing past the outer region of the seal assembly 57 through the radial clearance gap 68 between the shaft assembly 57 and wall 53 of the bore 52. The retaining ring 72 helps maintain the seal assembly 57 in its self-centered adjusted position relative to the shaft 58 during operation of the compressor.

Figure 4:
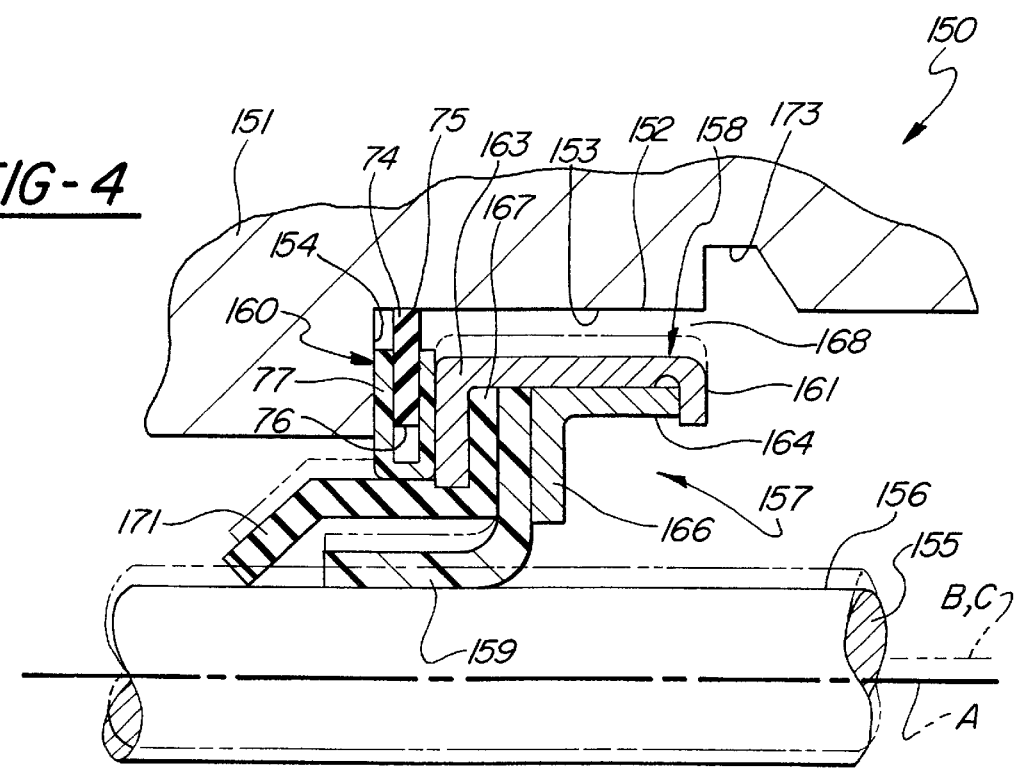
FIG. 4 is an enlarged fragmentary sectional view of a seal system according to a second embodiment of the invention.

FIG. 4 shows an alternative embodiment similar to that of FIGS. 2 and 3, and wherein like reference numerals are used to indicate like features with regard to the first embodiment, but are offset by 100. The shaft seal system 150 includes the same housing 151 and the shaft 155 arrangement having the same features and including a seal assembly 157 having the same carrier 158 with the same outer and inner cases 161, 164 mounting a PTFE lip seal 159 of the same lay down-type configuration.

In this second embodiment, the lip 171 is formed as an extension of the elastomeric gasket 167, but the two nonetheless operate in the same manner as in the first embodiment. The face seal 160 is different in that it is not molded onto the carrier 158 of elastomeric rubber composition. Rather, the face seal 160 is separate from the carrier 158 and is installed in the bore 152 prior to installation of the carrier 158. The face seal 160 includes an annular elastomeric washer 74 having a radially outer surface 75 engaging the cylindrical wall 153 of the bore 152, and a radially inner surface 76 spaced radially from and unsupported by the carrier 158 so as to maintain independence of radial movement of the carrier 158 relative to the separate washer 74. The face seal 160 may further include a PTFE sleeve 77 fabricated preferably of PTFE or other low friction material having a generally U-shaped cross-section and intervening between the washer 74 and carrier 158 on one side, and the washer 74 and cylinder wall 153 on the other side to accommodate relative radial movements of the seal assembly 157 and the bore 152 without abrading the stationary elastomeric washer 74. The shaft seal system 150 otherwise operates the same as that of the first embodiment, including provision of a retainer (not shown) disposed within the ring groove 173.

Figure 5:
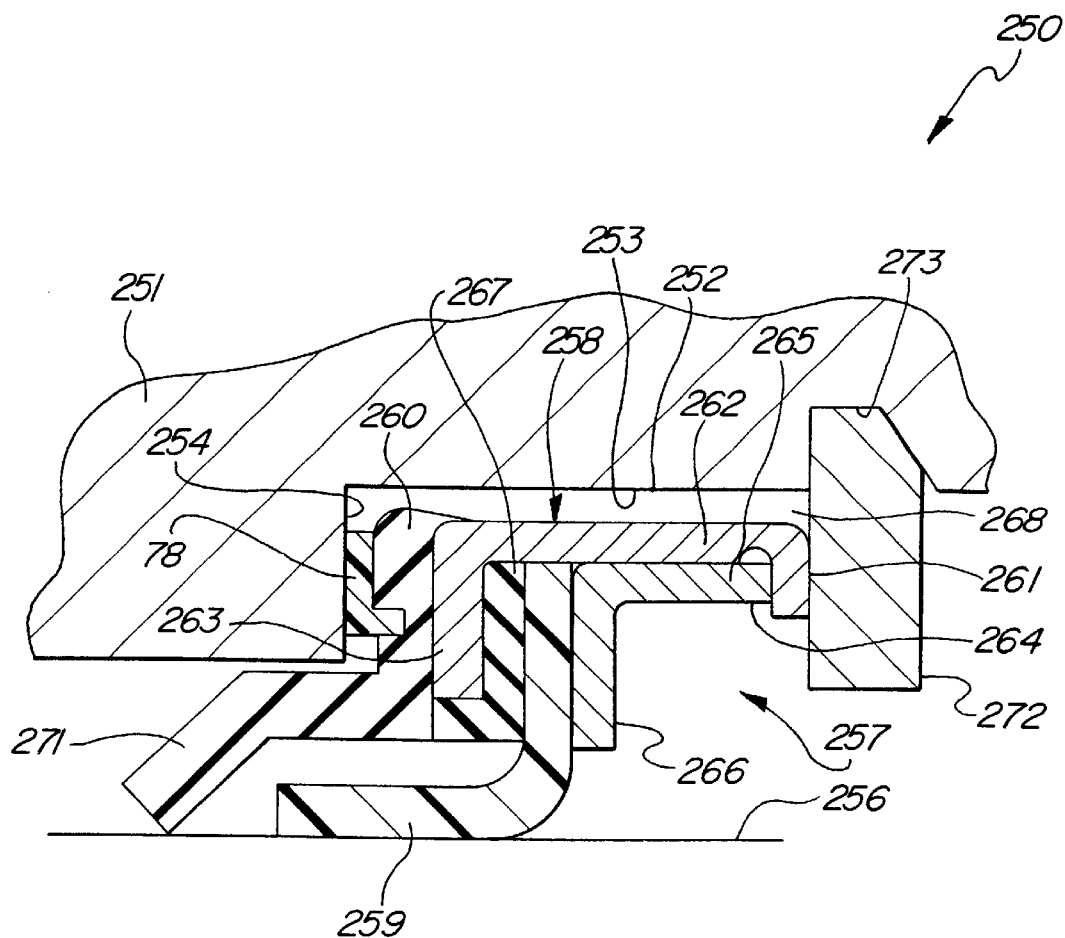
FIG. 5 is an enlarged fragmentary sectional view of a seal system according to a third embodiment of the invention.

FIG. 5 shows a third embodiment similar to the first and second embodiments described previously. The same reference numerals used in connection with the first embodiment are used for the third embodiment of FIG. 5, but are offset by 200.

The shaft seal system 250 includes the same housing 251 and shaft 255 arrangement and features and includes a seal assembly 257 having the same carrier 258 with outer and inner cases 261, 264 clamping a PTFE main seal element 259 together with an elastomeric gasket 267.

The face seal 260 differs in that the bead 270 is provided with a PTFE liner 78 engaging the sealing shoulder 254 of the housing 251 for reducing friction during radial movement of the seal assembly 257 relative to the housing 251. The shaft seal system 250 operates in the same manner as that described previously in connection with the shaft seal assembly 50 of the first embodiment.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A self-centering shaft seal system comprising:

a housing formed with a bore having a generally cylindrical wall of predetermined inner diameter disposed about a bore axis and an annular sealing shoulder disposed transverse to said axis;

a shaft supported for rotation within said bore having a generally cylindrical outer running surface disposed about a shaft axis;

a seal assembly disposed about said shaft having a metal carrier, at lease one radially acting shaft seal element mounted on said carrier about a longitudinal seal axis in dynamic sealing relation to said outer running surface of said shaft, and a face seal disposed axially between said carrier and said transverse sealing shoulder of said housing;

said seal assembly being radially undersized in relation to said bore wall in such manner as to define a radial clearance gap between said carrier and said bore wall free of radial obstructions that would prevent radial movement of said seal assembly relative to said bore wall so as to enable said shaft seal to support and center said seal assembly coaxially on said shaft including when said shaft axis is misaligned with said bore axis through corresponding radial displacement of said seal assembly within said bore of said housing, said face seal including a radial lip portion fixed to and projecting radially inwardly of said carrier and sealingly engaging said shaft in axially and radially spaced relation to said at least one shaft seal element.

2. The system of claim 1 including a retainer acting forcibly between said housing and said seal assembly to urge said face seal toward constant static sealing engagement with said sealing shoulder of said housing.

3. The system of claim 2 wherein said retainer comprises a snap ring.

4. The system of claim 3 wherein said housing includes a snap ring groove, said snap ring being mountable in said groove following said installation and centering of said seal assembly on said shaft to urge said face seal into said sealing engagement with said sealing shoulder and to support said seal assembly in said centered condition relative to said shaft.

5. The system of claim 1 wherein said face seal is fixed on said carrier.

6. The system of claim 1 wherein said face seal is separate from said carrier.

7. The system of claim 6 wherein said face seal has a radially outer surface engaging said bore wall and a radially inward surface spaced radially from and unsupported by said carrier so as to maintain independence of radial movement of said carrier relative to said separate face seal.

8. The system of claim 1 wherein said face seal includes at least a portion fabricated of polytetrafluoroethylene engaging said shoulder of said housing.

9. The system of claim 1 wherein said at least one shaft seal element comprises a member fabricated of polytetrafluoroethylene having a lip thereof that is axially bent and extends along said shaft.

10. The system of claim 1 wherein said clearance gap is free of any radial seals that would completely bridge said gap between said carrier and said bore wall and restrict freedom of said radial movement of said seal member relative to said bore wall.

* * * * *